United States Patent
Koo

(10) Patent No.: US 9,898,798 B2
(45) Date of Patent: **\*Feb. 20, 2018**

(54) ELECTRONIC APPARATUS, EXTERNAL APPARATUS AND METHOD OF CONTROLLING THE SAME

(71) Applicant: Samsung Electronics Co., Ltd., Suwon-si, Gyeonggi-do (KR)

(72) Inventor: Ja-goun Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,537

(22) Filed: Apr. 25, 2017

(65) Prior Publication Data

US 2017/0228852 A1 Aug. 10, 2017

Related U.S. Application Data

(63) Continuation of application No. 14/079,800, filed on Nov. 14, 2013, now Pat. No. 9,640,137.

(30) Foreign Application Priority Data

Dec. 3, 2012 (KR) .......................... 10-2012-0139239

(51) Int. Cl.
*G06F 13/40* (2006.01)
*G06T 1/20* (2006.01)
*G06F 1/16* (2006.01)

(52) U.S. Cl.
CPC .............. *G06T 1/20* (2013.01); *G06F 1/1632* (2013.01); *G06F 13/409* (2013.01); *G06F 13/4081* (2013.01); *G06F 2200/1639* (2013.01)

(58) Field of Classification Search
CPC ....... G06T 1/20; G06F 1/1632; G06F 13/409; G06F 13/4081; G06F 2200/1639
USPC ....................................... 345/501; 361/679.41
See application file for complete search history.

(56) References Cited

U.S. PATENT DOCUMENTS

| | | | |
|---|---|---|---|
| 5,991,838 A | 11/1999 | Swindler et al. | |
| 6,366,458 B1 * | 4/2002 | Yoshida | G06F 1/1632 361/679.41 |
| 6,745,330 B1 | 6/2004 | Maillot | |
| 7,649,735 B2 | 1/2010 | Iwaki | |
| 7,982,742 B2 | 7/2011 | Casparian et al. | |

(Continued)

FOREIGN PATENT DOCUMENTS

| | | |
|---|---|---|
| CN | 1897678 A | 1/2007 |
| EP | 0693731 A1 | 1/1996 |

OTHER PUBLICATIONS

Partial European Search Report dated Apr. 14, 2014 issued in EP Application No. 13194514.9.

(Continued)

*Primary Examiner* — Jacinta M Crawford
(74) *Attorney, Agent, or Firm* — Jefferson IP Law, LLP

(57) ABSTRACT

An electronic apparatus includes a locking unit to selectively lock a physical connection with an external apparatus and a control unit to control an operation mode of the electronic apparatus, according to a connection state with the external apparatus, in which the control unit controls the locking unit to lock the connection with the external apparatus, when the electronic apparatus is in an operation mode of using a graphic processing unit of the external apparatus.

20 Claims, 13 Drawing Sheets

(56) References Cited

U.S. PATENT DOCUMENTS

| | | |
|---|---|---|
| 8,081,443 B2 | 12/2011 | Iwaki |
| 8,717,371 B1 | 5/2014 | Wyatt |
| 2004/0104888 A1 | 6/2004 | Yoon et al. |
| 2004/0223293 A1 | 11/2004 | Nakano et al. |
| 2005/0030721 A1 | 2/2005 | Shimada et al. |
| 2005/0237327 A1 | 10/2005 | Rubinstein et al. |
| 2006/0282604 A1 | 12/2006 | Temkine et al. |
| 2007/0018956 A1 | 1/2007 | Kim et al. |
| 2007/0112989 A1 | 5/2007 | Iwaki |
| 2007/0171230 A1 | 7/2007 | Iwase et al. |
| 2007/0271404 A1 | 11/2007 | Dearth et al. |
| 2008/0117222 A1 | 5/2008 | Leroy et al. |
| 2008/0127224 A1 | 5/2008 | Hung |
| 2009/0187678 A1 | 7/2009 | Itoh et al. |
| 2010/0091445 A1 | 4/2010 | Iwaki |
| 2010/0245366 A1 | 9/2010 | Nath |
| 2011/0227830 A1 | 9/2011 | Chun |
| 2011/0261062 A1 | 10/2011 | Kawata et al. |
| 2012/0064758 A1 | 3/2012 | Grice et al. |
| 2013/0050122 A1 | 2/2013 | Kang et al. |

OTHER PUBLICATIONS

European Search Report dated Aug. 20, 2014 issued in EP Application No. 13194514.9.
"Safely Remove Devices From Your Computer", Internet, http://windows.microsoft.com.com/en-us/windows7/safely-remove-devices-from-your-computer, Aug. 8, 2014, pp. 1-2 (XP055133994).
Chinese Office Action dated Jun. 28, 2017, issued in the Chinese Application No. 201310636842.1.
Chinese Office Action dated Dec. 5, 2017, issued in the Chinese Application No. 201310636842.1.

\* cited by examiner

ELECTRONIC APPARATUS, EXTERNAL APPARATUS AND METHOD OF CONTROLLING THE SAME

CROSS-REFERENCE TO RELATED APPLICATIONS

This application is a continuation application of prior application Ser. No. 14/079,800, filed on Nov. 14, 2013, which issues as U.S. Pat. No. 9,640,137 on May 2, 2017 and claimed the benefit under 35 U.S.C § 119(a) of a Korean patent applications filed on Dec. 3, 2012 in the Korean Intellectual Property Office and assigned Serial No. 10-2012-0139239, the entire disclosures of each of which is hereby incorporated by reference.

BACKGROUND OF THE INVENTION

1. Field of the Invention

The present general inventive concept relates to an electronic apparatus, an external apparatus and a method of controlling the same, and more specifically, to an electronic apparatus, an external apparatus and a method of controlling the same, in which a physical short circuit between the electronic apparatus and the external apparatus is prevented when the electronic apparatus uses a graphic function of the external apparatus.

2. Description of the Related Art

In a conventional personal computer, a graphic processing unit (GPU) may be included in the same package with a central processing unit (CPU) or a main chipset (iGPS, integrated Graphics Processing Unit), or may be mounted on a main board in a separate package (dGPU, discrete Graphics Processing Unit), or designed as a separate module to be mounted on a system. Further, by combining an iGPU with an iGPU, or combining a dGPU with a dGPU, high graphic processing performance could be provided.

Moreover, there have been recent advancements regarding applications and contents that require high processing capacity of GPU, such as multimedia, games, etc. However, complications with high-performance GPUs within systems having an emphasis on mobility, such as laptop computers, tablet computers, etc., include the problems of power consumption, generation of heat, etc.

For this reason, a system is being introduced in which an iGPU having a relatively low power consumption is implemented, and high-performance dGPU is implemented in a docking apparatus that can be attachable to and detachable from a main system, thereby enabling to use a GPU of a docking apparatus as needed.

However, the above system experiences a significant problem that is caused by a sudden release of a docking apparatus from a laptop. Specifically, when a cable connector, which connects the docking apparatus and the laptop, comes out while driving a laptop using a GPU of the docking apparatus, there occurs a system failure on the laptop computer.

SUMMARY OF THE INVENTION

The present general inventive concept provides an electronic apparatus, an external apparatus and a method of controlling the same, in which a physical short circuit between the electronic apparatus and the external apparatus is prevented when the electronic apparatus uses a graphic function of the external apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an electronic apparatus, which includes a locking unit to selectively lock a physical connection with the external apparatus and a control unit to control an operation mode of the electronic apparatus, according to a connection state with the external apparatus, in which the control unit controls the locking unit to lock the connection with the external apparatus, when the electronic apparatus is in an operation mode of using a graphic processing unit of the external apparatus.

The electronic apparatus may further include a graphic processing unit to perform the graphic processing.

When the electronic apparatus and the external apparatus are not connected, the control unit may control the electronic apparatus to operate in a first operation mode in which the electronic apparatus uses only the graphic processor to perform a graphic processing, and when the electronic apparatus and the external apparatus are connected, the control unit may control the electronic apparatus to operate in a second operation mode in which the electronic apparatus uses at least one of the graphic processing unit and a graphic processing unit of the external apparatus to perform a graphic processing.

The electronic apparatus may further include a user interface unit to receive input of command to release connection from the external apparatus, in which when the connection release command is input, the operation mode of the electronic apparatus is converted to an operation mode of using only the graphic processing unit in the electronic apparatus.

When the operation mode of the electronic apparatus is converted to an operation mode of using only the graphic processing unit in the electronic apparatus, the control unit may control the locking unit to release connection from the external apparatus.

The user interface unit may receive input of the connection release command through a user interface window.

The user interface unit may receive input of the connection release command through a physical button to release the external apparatus from the electronic apparatus.

The electronic apparatus may further include a socket unit to perform interfacing between the electronic apparatus and the external apparatus, in which the electronic apparatus and the external apparatus are connected through a cable connector, and the user interface unit may receive input of the connection release command through a physical button to release the connector of the cable connector from the socket unit.

The electronic apparatus and the external apparatus may be connected through a cable connector having a predetermined groove, in which the electronic apparatus is electrically and physically connected with the cable connector, and may further include a socket unit to interface between the electronic apparatus and the cable connector, and the locking unit may include a moving member that may move with respect to the groove.

The connector of the cable connector may include a plurality of terminals which are electrically connected with the socket unit and a substrate having the plurality of terminals, and the groove may be positioned at one side of the substrate.

The connector of the cable connector may be provided with a physical button to release the connector of the cable connector from the socket unit, and the physical button may be electrically connected with at least one terminal among the plurality of terminals to transmit connection release command to the electronic apparatus.

The button may be connected to a Hot Plug Detect (HPD) terminal among the plurality of terminals.

The electronic apparatus may further include a user interface unit configured to display detachability from the external apparatus, when the external apparatus is connected with the external apparatus.

The user interface unit may display the detachability through a user interface window.

The user interface unit may display the detachability by using a light emitting device which emits lights according to a position of the moving member of the locking unit.

The electronic apparatus may further include a socket unit configured to perform interfacing between the electronic apparatus and the external apparatus, in which the socket unit may be directly connected with the external device.

The socket unit may be interfaced with the external apparatus via at least one of HDMI and thunderbolt.

The graphic processor may be an iGPU provided for a CPU or a main board chip.

The foregoing and/or other features and utilities of the present general inventive concept may also be achieved by providing an external apparatus, which includes a locking unit to selectively lock a physical connection with the electronic apparatus, a graphic processing unit to perform graphic processing of the electronic apparatus, and a control unit to control the locking unit to lock connection with the electronic apparatus, when the electronic apparatus is in an operation mode of using a function of the graphic processor.

The electronic apparatus and the external apparatus may be connected through a cable connector having a predetermined groove, and the external apparatus may further include a socket unit to perform interfacing between the connector of the cable connector and the external apparatus, and the locking unit may include a moving member that may be moved with respect to the groove.

The foregoing and/or other features and utilities of the present general inventive concept may also be achieved by providing a method of controlling an electronic apparatus connectable with an external apparatus, including receiving a command to release connection from the external apparatus, converting the operation mode of the electronic apparatus to an operation mode of not using a function of the external apparatus, and releasing a physical connection with the external apparatus by moving a moving member that is movable, when an operation mode of the electronic apparatus is converted.

The foregoing and/or other features and utilities of the present general inventive concept may also be achieved by providing an electronic apparatus connectable with an external apparatus, including a locking unit to selectively lock a physical connection with the external apparatus based on the electronic apparatus switching from a first operation mode to a second operation mode, wherein the second operation mode allows the electronic apparatus to access at least one component of the external apparatus.

The electronic apparatus may further include a control unit to control the locking unit to lock the physical connection with the external apparatus in response to the switch from the first operation mode to the second operation mode.

The at least one component may be a graphic processing unit of the external apparatus.

The first operation mode may not allow the electronic apparatus to access the at least one component of the external apparatus.

The conversion of the electronic apparatus from a first operation mode to a second operation mode may occur in response to the established connection between the electronic apparatus and the external apparatus.

The locking unit may include a moving member to shift from a first position such that the electronic apparatus is unlocked, to a second position to lock the electronic apparatus to the external apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
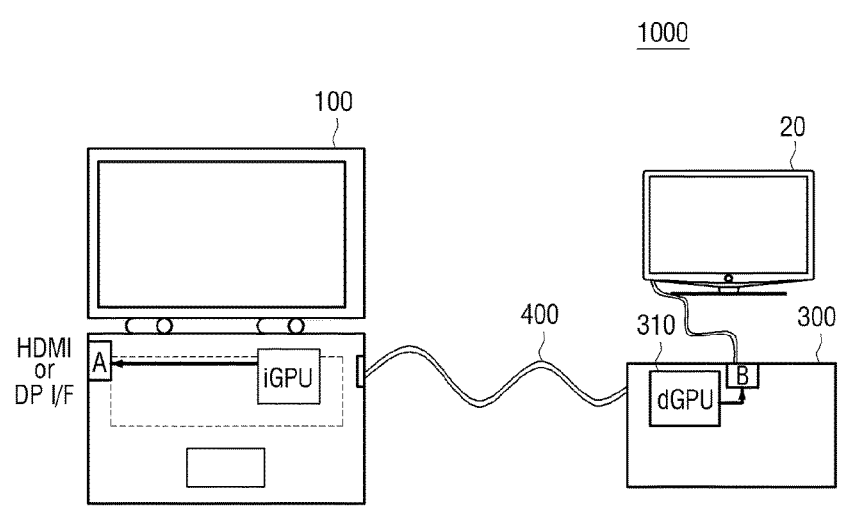
FIG. 1 is a view illustrating an example of an electronic system according to an exemplary embodiment of the present general inventive concept.

Reference will now be made in detail to the embodiments of the present general inventive concept, examples of which are illustrated in the accompanying drawings, wherein like reference numerals refer to the like elements throughout.

The embodiments are described below in order to explain the present general inventive concept while referring to the figures.

FIG. 1 is a view illustrating an example of an electronic system 1000 according to an exemplary embodiment of the present general inventive concept.

Referring to FIG. 1, the electronic system 1000 according to an exemplary embodiment of the present general inventive concept includes an electronic apparatus 100 and an external apparatus 300.

The electronic apparatus 100 receives input of a driving command from a user, and operates according to the received driving command. Further, the electronic apparatus 100 is connected with the external apparatus 300 through a cable connector 400, or directly connected therewith. Examples of such electronic apparatus 100 may include a laptop, a tablet PC, a mobile phone, a smart phone, a PMP, an MP3, etc., but is not limited thereto.

Figure 5:
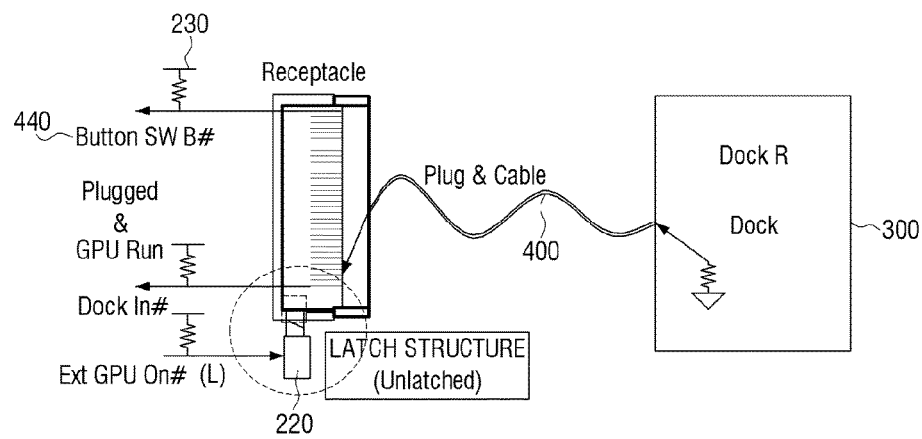

Specifically, when the electronic apparatus 100 is not connected with the external apparatus 300, the electronic apparatus 100 operates in a first operation mode using its own graphic processing unit, and when the electronic apparatus 100 is connected with the external apparatus 300, the electronic apparatus 100 operates in a second operation mode using a graphic processing unit of the external apparatus 300. Further, the electronic apparatus 100 may include a locking unit 220, as illustrated in FIG. 5, to prevent the electronic apparatus 100 from being electrically isolated from the external apparatus 300. The structure and function of the electronic apparatus will be described below with reference to FIG. 2.

The external apparatus 300 is an apparatus to expand functions of the electronic apparatus 100. More specifically, the external apparatus 300 may be a docking apparatus that is not able to operate by itself, but operates only when being mounted on the electronic apparatus 100. Specifically, the external apparatus 300, which is equipped with a graphic processing unit 310, may expand graphic processing performance of the electronic apparatus 100. Further, the external apparatus 300 may expand user interface function of the electronic apparatus 100. For example, as illustrated in FIG. 1, a display function may be expanded though an external display apparatus 20, or an input function may be expanded by using a keyboard, a touch pad, or any other type of motion sensor and/or detector included therein. Further, the external apparatus 300 may expand storage space of the electronic apparatus 100. Although the exemplary embodiment of the present general inventive concept assumes that the external apparatus 300 is a docking apparatus that is not able to operate by itself, the external apparatus 300 may be embodied as an apparatus that is able to operate by itself.

The electronic system 1000, as described above, may prevent a physical short circuit between the electronic apparatus 100 and the external apparatus 300 by using the locking unit 220 of FIG. 5, when the electronic apparatus 100 uses a graphic function of the external apparatus 300.

Figure 11:
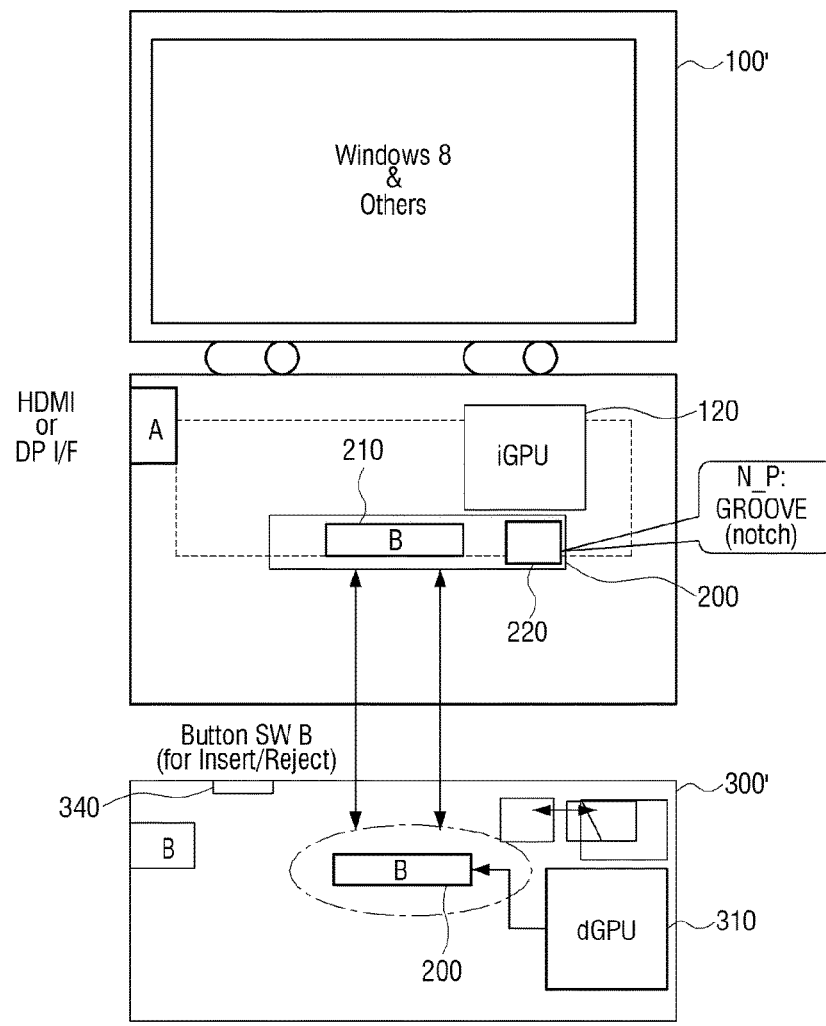
FIG. 11 is a view illustrating an example of the electronic apparatus and the external apparatus according to another exemplary embodiment of the present general inventive concept.
Figure 12:
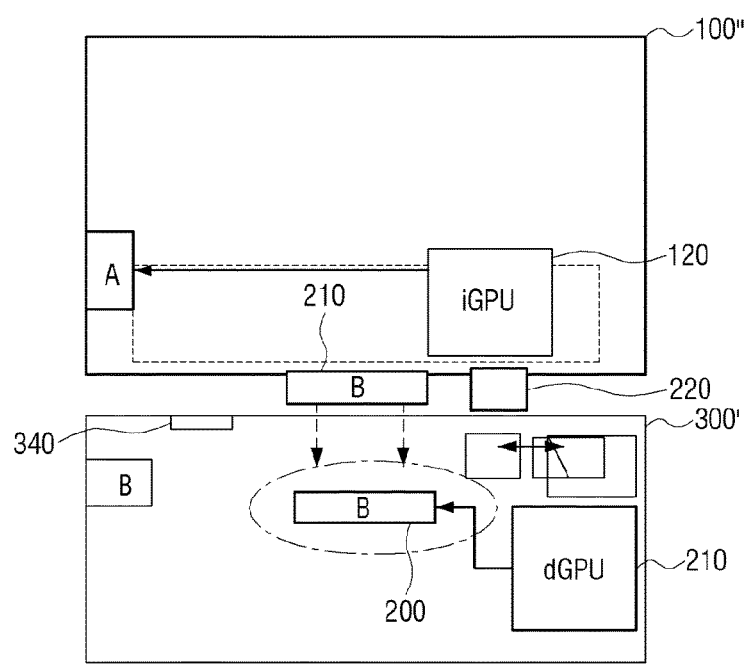
FIG. 12 is a view illustrating an example of the electronic apparatus and the external apparatus according to another exemplary embodiment of the present general inventive concept.

Meanwhile, although illustrated and described in FIG. 1 that the electronic apparatus 100 and the external apparatus 300 are connected through the cable connector 400, the electronic apparatus 100 and an external apparatus 300 may be directly connected as illustrated in FIGS. 11 and 12. Such example will be described below with reference to FIGS. 11 and 12.

Figure 2:
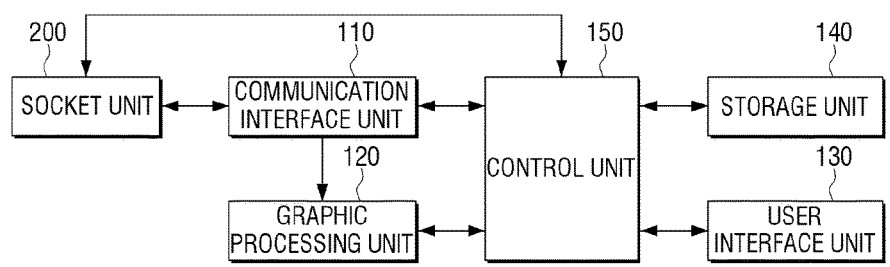
FIG. 2 is a block diagram illustrating an example of an electronic apparatus according to an exemplary embodiment of the present general inventive concept.

FIG. 2 is a block diagram illustrating an example of an electronic apparatus 100 according to an exemplary embodiment of the present general inventive concept.

Referring to FIG. 2, the electronic apparatus 100 according to an exemplary embodiment of the present general inventive concept includes a communication interface unit 110, a graphic processing unit 120, a user interface unit 130, a storage unit 140, a control unit 150 and a socket unit 200. Herein, the electronic apparatus 100 may be a laptop, a tablet PC, an MP3, a PMP, etc., which can be connectable with the external apparatus 300, as illustrated in FIG. 1. Hereinafter, description will be made by assuming that the external apparatus 300 is a docking apparatus.

The electronic apparatus 100 includes a plurality of operation modes. The plurality of operation modes includes a first operation mode in which a graphic is processed by only a graphic processing unit 120 provided inside the electronic apparatus 100, and a second operation mode in which a graphic is processed by a graphic processing unit 310 within the external apparatus 300. Meanwhile, in the exemplary embodiment of the present general inventive concept, operation modes are divided depending on whether a graphic processing function is used. However, such operation modes may be divided into a first operation mode of not using an external apparatus, and a second operation mode of using an external apparatus.

The communication interface unit 110 is formed to connect the electronic apparatus 100 with the external apparatus 300 of FIG. 1, in which connection may be made to the external apparatus 300 through Local Area Network (LAN) and Internet network, as well as by wireless communications (for example, GSM, UMTS. LTE, WiBRO, etc.).

Further, the communication interface unit 110 may communicate with the external apparatus 300 through the socket unit 200. Specifically, when the electronic apparatus 100 is connected with the external apparatus 300, the communication interface unit 110 transmits a command to process a graphic to be processed in the graphic processing unit 310, and receives the processing result.

In addition, the communication interface unit 110 may receive input of a user control command from the external apparatus 300, and transmit an image (or a moving image) to be displayed on the external apparatus 300. Further, the communication interface unit 110 may be connected to an external apparatus 300 or Internet network through the external apparatus 300.

The socket unit 200 is configured to interface between the electronic apparatus 100 and the external apparatus 300. Specifically, the socket unit 200 may be connected to an external apparatus through the cable connector 400 as illustrated in FIG. 1, and may also be directly connected to the socket unit 200 of the external apparatus, as illustrated in FIGS. 11 and 12.

In addition, the socket unit 200 may include the locking unit 220 of FIG. 5 that selectively locks a physical connection with the external apparatus 300 by using a moving member that is movable. For example, when the external apparatus 300 and the electronic apparatus 100 are connected through a cable connector 400, the locking unit selectively locks a physical connection between the cable connector 400 and the electronic apparatus 100, and when the external apparatus 300 and the electronic apparatus 100 are directly connected, the locking unit 220 selectively locks a physical connection between the two apparatuses. Specific operation of the socket unit 200 will be described below with reference to FIG. 4.

A graphic processing unit 120 is configured to perform graphic processing. Specifically, the graphic processing unit 120 processes computation associated with graphics, and operates independently when the electronic apparatus 100 is in a first operation mode. Further, when the electronic apparatus 100 is in a second operation mode, the graphic processing unit 120 distributedly processes computation associated with graphics along with a graphic processing unit 310 of the external apparatus 300.

The graphic processing unit 120 may be implemented in an independent packaging of dGPU, or in an iGPU within a CPU or a main board chip. Further, the electronic apparatus 100 may be embodied to include a plurality of graphic processing units. For example, the electronic apparatus 100 may be provided with an iGPU and a dGPU, and may process computation associated with graphics using one iGPU, or two dGPUs, when connected to the external apparatus 300.

Further, when connected with the external apparatus 300, that is, when the electronic apparatus 100 is in a second operation mode, the graphic processing unit 120 may determine whether to perform graphic processing operations independently or along with a graphic processing unit 310 connected to the external apparatus 300, based on a demand for graphic processing capacity made by an application being executed.

Specifically, in the case where high graphic performance is not required, the graphic processing unit 120 may perform graphic processing independently, even when being connected to the external apparatus 300. Further, when an application that requires high graphic performance, such as a game, is driven, the graphic processing unit 120 may determine to perform graphic processing along with a graphic processing unit of the external apparatus 300 or determine that graphic processing is performed only by the graphic processing unit 310 of the external apparatus. For example, when a processed graphic is displayed on a display apparatus connected to the external apparatus 300, the graphic processing unit 120 may control that the graphic processing is performed only by the graphic processing unit 310 of the external apparatus 300.

A user interface unit 130 includes a plurality of function keys by which a user may set or select various functions supported by the electronic apparatus 100, and may display various information provided by the electronic apparatus 100. The user interface unit 130 may be embodied as an apparatus, such as a touch screen, which performs an input and an output operation at the same time. Meanwhile, the user interface unit 130 may further include a certain button, etc.

Further, the user interface unit 130 may display various information provided by the electronic apparatus 100 on the external apparatus 300 through the communication interface unit 110. Specifically, when the electronic apparatus 100 is connected with the external apparatus 300, the user interface unit 130 may control the communication interface unit 110 so that a user interface window to be displayed on the electronic apparatus 100 may be displayed on the external apparatus 300, or on a display apparatus 20 connected to the external apparatus 300.

When the electronic apparatus 100 is connected with the external apparatus 300, the user interface unit 130 may display the connection with the external apparatus 300. Further, the user interface unit 130 may receive input of a connection release command to release connection from the external apparatus 300. The connection release command may be selected through the user interface window, and the input of which may be received through a separate button.

The user interface unit 130 may display detachability from the external apparatus 300. Specifically, following a connection release command by a user, the electronic apparatus 100 is in a condition detachable from the external apparatus 300, that is, an operation mode of the electronic apparatus 100 is converted from a second operation mode to a first operation mode, the detachability may be displayed. The display operation may be performed through the user interface window, and may also be performed through a separate light emitting device. The example of using a separate light emitting device will be described below with reference to FIGS. 7 and 8, and the example of using the user interface window will be described with reference to FIG. 10.

A storage unit 140 may be configured to store a program to drive the electronic apparatus 100. Specifically, the storage unit 140 may store a program which is a collection of various instructions needed for driving the electronic apparatus 100. Herein, the program includes not only an application to provide a certain service, but also an operating program to drive an application.

The storage unit 140 may be embodied as a storage medium and an external storage medium in the electronic apparatus 100, for example, a removable disk including a USB memory, or a web server through a network.

A control unit 150 is configured to control each element in the electronic apparatus 100. Specifically, the control unit 150 determines an operation mode depending on whether the external apparatus 300 is mounted. More specifically, the control unit 150 determines a second operation mode when the electronic apparatus 100 is connected with the external apparatus 300, and determines a first operation mode when the electronic apparatus 100 is not connected with an external apparatus 300.

Further, when connected with the external apparatus 300, the control unit 150 may control each element in the external apparatus 300.

The control unit 150 is configured to control the locking unit 220 of FIG. 5 according to an operation mode of the electronic apparatus 100. Specifically, when the electronic apparatus 100 is in a first operation mode, the control unit 150 controls a moving member of the locking unit 220 to be positioned at a predetermined first position, and when the electronic apparatus 100 is in a second operation mode, the control unit 150 controls a moving member of the locking unit 220 to be positioned at a predetermined second position. Herein, the predetermined first position is a position of the moving member where a connector of the cable connector 400 or the socket unit 200 of the external apparatus 300 is allowed to be moved to the socket unit 200 without disturbance, and the predetermined second position is a position of a groove of the connector of the cable connector 400 or a position of a certain groove of the external apparatus 300 where the connector of the cable connector 400 or the socket unit 200 of the external apparatus 300 is not allowed to be moved.

Further, with the electronic apparatus 100 in a second operation mode, when receiving input of a connection release command through the user interface unit 130, the control unit 150 may convert the operation mode of the electronic apparatus 100 to a first operation mode. Upon completion of the mode conversion, the control unit 150 may control the locking unit 220 of FIG. 5 to be released from the external apparatus 300 or the cable connector 400.

As described above, according to exemplary embodiments of the present general inventive concept, the electronic apparatus 100 of the present general inventive concept has an effect in that a physical short circuit between the electronic apparatus 100 and the external apparatus 300 is prevented by using the locking unit 220 of FIG. 5 when the electronic apparatus 100 is in a second operation mode. By preventing a physical short circuit between the electronic apparatus 100 and an external apparatus 300 as mentioned above, an unintentional, sudden release of a dGPU can also be prevented when using a graphic processing unit 310 of the external apparatus 300, thereby enabling a safe use of a PC system.

Meanwhile, although the above exemplary embodiment of the present general inventive concept describes the situation where the electronic apparatus 100 uses a graphic processing function of the external apparatus 300 resulting in an operation mode of the electronic apparatus 100 being converted and the locking unit 220 being controlled, the present general inventive concept may also be embodied using other functions. More specifically, the present general inventive concept may include a user interface function (for example, a keyboard function and a display function) or a storage function, etc., in addition to a graphic processing function of the external apparatus 300, such that the locking unit 220 is controlled so as not to release the external apparatus 300, and that when other functions are not used, the locking unit 220 may be controlled so that the external apparatus 300 may be released.

Figure 3:
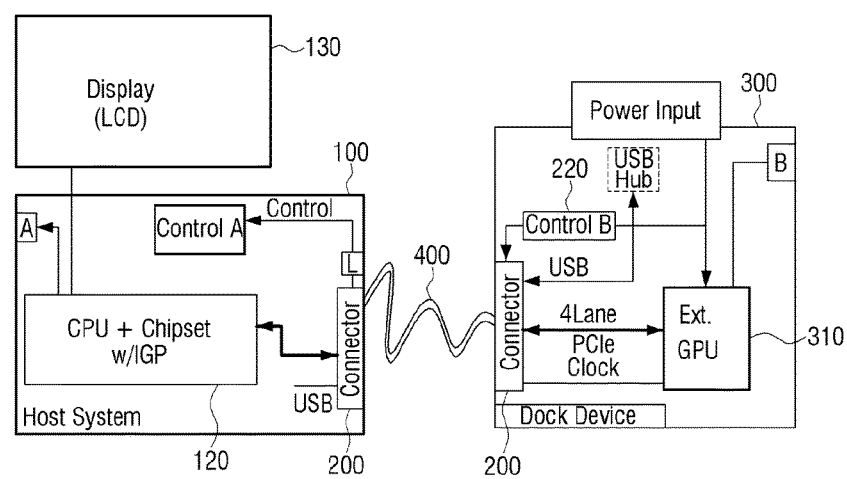
FIG. 3 is a block diagram illustrating an example of an external apparatus according to an exemplary embodiment of the present general inventive concept.

FIG. 3 is a block diagram illustrating an example of an external apparatus 300 according to an exemplary embodiment of the present general inventive concept.

Referring to FIG. 3, the external apparatus 300 according to an exemplary embodiment of the present general inventive concept is a docking apparatus that includes a graphic processing unit 310, a control unit 320 and a socket unit 200. Herein, the external apparatus 300 is an apparatus that may expand at least one function of the electronic apparatus 100, for example, a graphic function, an input function or an output function of the electronic apparatus 100.

The socket unit 200 is configured to perform interfacing between the electronic apparatus 100 and the external apparatus 300. Specifically, the socket unit 200 may be connected with the electronic apparatus 100 through the cable connector 400 as illustrated in FIG. 1, and may be directly connected with the socket unit 200 of the electronic apparatus 100, as illustrated in FIGS. 11 and 12.

Further, the socket unit 200 uses a moving member that is movable, and includes a locking unit 220 of FIG. 5 that locks a physical connection with the electronic apparatus 100. For example, when the external apparatus 300 and the electronic apparatus 100 are connected through the cable connector 400, the locking unit 220 may selectively lock a physical connection between the cable connector 400 and the electronic apparatus 100. Specific operation of the socket unit 200 will be described below with reference to FIG. 4.

Meanwhile, although described in FIG. 3 that when the external apparatus 300 is directly connected with the electronic apparatus 100, the socket unit 200 of the external apparatus 300 performs a physical locking, the connection operation may be performed in one of the socket unit 200 of the external apparatus 300 and the socket unit 200 of the electronic apparatus 100.

The graphic processing unit 310 is configured to perform a graphic processing of the electronic apparatus 100. Specifically, when the external apparatus 300 is connected to the electronic apparatus 100, and the electronic apparatus 100 is in a second operation mode, the graphic processing unit 120 may distributedly process computation associated with graphics of the electronic apparatus 100 along with the graphic processing unit 310 of the external apparatus 300.

The control unit 320 is configured to control each element in the external apparatus 300. Specifically, the control unit 320 controls the locking unit according to an operation mode. For example, when the electronic apparatus 100 is in a first operation mode, the control unit 320 controls a moving member of the locking unit to be positioned at a predetermined first position, and when the electronic apparatus 100 is in a second operation mode, the control unit 320 controls a moving member of the locking unit to be positioned at a predetermined second position. Herein, the predetermined first position is a position of the moving member where a connector of the cable connector 400 or the socket unit 200 of the external apparatus 300 is allowed to be moved to the socket unit without disturbance, and the predetermined second position is a position of a groove of the connector of the cable connector 400 or a position of a certain groove of the external apparatus 300 where the connector of the cable connector 400 or the socket unit 200 of the external apparatus 300 is not allowed to be moved.

As described above, according to the exemplary embodiment of the present general inventive concept, the external apparatus 300 of the present general inventive concept has an effect in that a physical short circuit between the electronic apparatus 100 and an external apparatus 300 is prevented by using the locking unit 220 of FIG. 5 when operating in a second operation mode of using the graphic processing unit 310 of the external apparatus 300. By preventing a physical short circuit between the electronic apparatus 100 and the external apparatus 300 as mentioned above, an unintentional, sudden release of a dGPU can also be prevented when using the graphic processing unit 310 of an external apparatus 300, thereby enabling a safe use of a PC system.

Meanwhile, although illustrated and described in FIG. 3 that the external apparatus 300 is connected with the electronic apparatus 100 through the socket unit 200 and the cable connector 400, the external apparatus 300 may be embodied as an apparatus including only a cable connector 400. That is, the cable connector 400 and the external apparatus 300 illustrated in FIG. 3 may be embodied in a single apparatus.

Meanwhile, although illustrated and described in FIG. 3 that the external apparatus 300 expands only the graphic processing performance of the electronic apparatus 100, the external apparatus 300 may also expand a network connecting function (for example, when a LAN is connected to the external apparatus 300), a storage function (for example, when the external apparatus 300 is provided with an additional HDD or SDD), or a user interface function (for example, a keyboard, a mouse, a touch screen, a touch pad, etc.).

Figure 4:
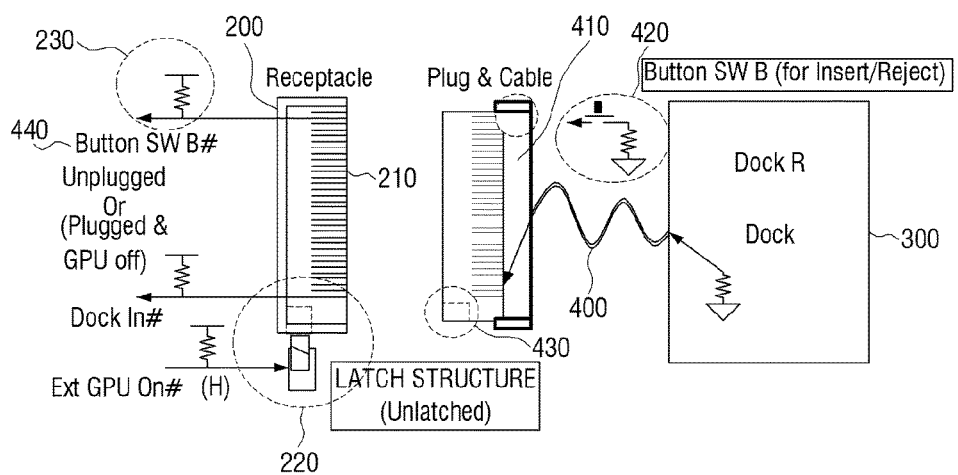
FIGS. 4 and 5 are views illustrating an operation of a socket unit in FIG. 2 according to an exemplary embodiment of the present general inventive concept.

FIGS. 4 and 5 are views illustrating an operation of the socket unit 200 of FIG. 2. Specifically, FIG. 4 is a view illustrating the socket unit 200 before being connected with the cable connector 400, and FIG. 5 is a view illustrating the socket unit 200 when being connected with the cable connector 400.

Referring to FIGS. 4 and 5, the socket unit 200 includes a housing unit 210 and a locking unit 220.

The housing unit 210 is connected to the external apparatus 300 through a connector 410 of the cable connector 400. Specifically, the housing unit 210 includes a plurality of terminals, and may be connected one-on-one with a plurality of terminals of the connector 410 of the cable connector 400. Pins of the plurality of terminals may be arranged in an HDMI or thunderbolt manner.

One terminal 230 of the plurality of terminals may be electrically connected with a physical button 440 to release the connector of the cable connector. Therefore, with the connector 410 of the cable connector 400 connected to the housing unit 210, when a user pushes the physical button 440 of the connector 410 of the cable connector 400, one terminal of the connector of the cable connector, which is connected to the physical button, is grounded by the pushing of the physical button 440, and one terminal 230 of the housing unit 210 connected thereto is also grounded. Thus, the electronic apparatus 100 determines that a connection release command is input from a user to release the cable connector 400 from the electronic apparatus 100, and an operation mode of the electronic apparatus 100 is converted as described above.

Meanwhile, one terminal connected to the physical button 440 as mentioned above may be an HPD pin. When the HPD pin is electrically connected to the physical button 440 as described above, not only the electronic apparatus 100, but also the external apparatus 300 may indirectly recognize the input of connection release command.

The locking unit 220 locks a physical connection with the external apparatus 300 by using a moving member that is movable by an electric signal (ext GPU ON#). Specifically, the locking unit 220 is arranged at one side of the housing unit 210, and more specifically, arranged at a position corresponding to a predetermined groove 430 of the connector 410 of the cable connector 400. When the electronic apparatus 100 is in a first operation mode, the moving member is placed inside the locking unit 220, and when the operation mode of the electronic apparatus 100 is converted to a second operation mode by being connected with the connector 410 of the cable connector 400, the moving member is moved to the predetermined groove 430 such that the connector 410 of the cable connector 400 is not released from the electronic apparatus 100.

Further, with the electronic apparatus 100 in a second operation mode, when a connection release command is input from a user, and the operating mode of the electronic apparatus 100 is converted to a first operation mode, the locking unit 220 moves the moving member to the inside of the locking unit 220 to release the connector 410 of the cable connector 400.

The cable connector 400 may include a cable 420, a connector positioned at both ends of the cable 420 and a button.

One or more signal lines are formed in a cover of the cable 420. When the cable connector 400 is connected between the electronic apparatus 100 and the external apparatus 300, an electric signal and power source are transmitted between the two apparatuses through the one or more signal lines formed inside the cable 420.

The connector 410 is formed at both ends of the cable 420. Specifically, the connector 410 includes a substrate, a plurality of terminals are formed on one surface or both surfaces of the substrate, one end of the plurality of terminals is connected with the signal line, and the other end may be electrically connected with a terminal of the housing unit 210. The formation of the connector 410 may correspond to the formation of the housing unit 210.

The substrate of the connector 410 may have the predetermined groove 430 positioned at the side thereof. The predetermined groove 430 may be coupled with the moving member of the locking unit 220. Meanwhile, although illustrated and described in the exemplary embodiment of the present general inventive concept that the predetermined groove 430 is arranged at the side of the substrate, the predetermined groove 430 may be positioned at the center of the substrate. In this case, the locking unit 220 is arranged at a lower or upper position of the housing unit 210, and the moving member is moved to an upper or lower position so as to lock the connector 410.

The button 440 is where a user pushes to release the cable connector 400 from the electronic apparatus 100. The button 440 includes an electric switch, which may be electrically connected with one of the plurality of terminals of the connector 410. Thus, when the user pushes the button 440, one of the plurality of terminals is grounded, and a terminal of the housing unit 210 connected to the corresponding terminal is also grounded, such that pushing of the button by the user may be notified to the electronic apparatus 100.

Further, the cable connector 400 may include a physical latch, which is spaced apart by the button 440.

Although described in FIGS. 4 and 5 that the locking unit 220 is provided inside the socket unit 200, the locking unit 220 may be external from the socket unit 200. Further, although described that the connector 410 is formed at both ends of the cable 420, it may be embodied that the connector 410 may be formed at only one end of the cable 420, and the other end of the cable 420 may be directly connected to the external apparatus 300 without the connector 410.

Figure 6:
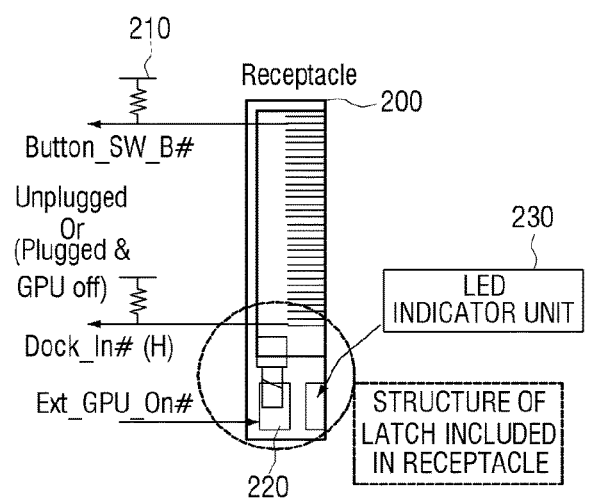
FIG. 6 is a view illustrating an example of a socket unit according to another exemplary embodiment of the present general inventive concept.
Figure 7:
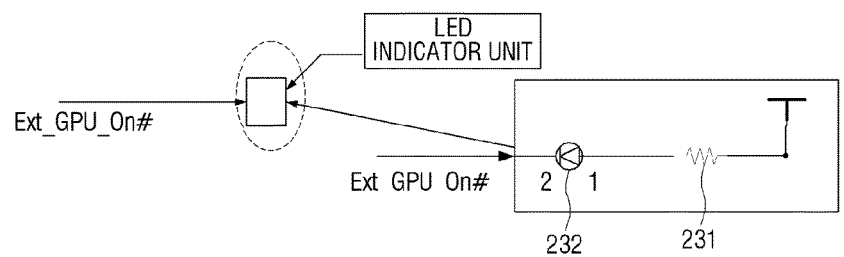
FIG. 7 is a view illustrating a specific example of an LED display unit in FIG. 6.

FIGS. 6 and 7 are views illustrating a socket unit 200 and a display unit (a.k.a., an LED display unit or an LED indicator unit) 230, respectively, according to an exemplary embodiment of the present general inventive concept.

Referring to FIGS. 6 and 7, the socket unit 200 according to another exemplary embodiment of the present general inventive concept includes a housing unit 210, a locking unit 220 and the display unit 230. The housing unit 210 and the locking unit 220 are operated in the same manner as in FIGS. 4 and 5, and thus, additional description thereof will be omitted.

The display unit 230 is configured to display detachability form the external apparatus 300. Specifically, the display unit 230 includes a resistor 231 arranged in series with and a light emitting device 232. Further, the display unit 230 is operated by a driving signal (Ext GPU On#) that drives the locking unit 220. Meanwhile, although FIGS. 6 and 7 illustrate that the display unit 230 is operated by the driving signal of the locking unit 220, a separate signal line may be used to operate the display unit 230.

Figure 8:
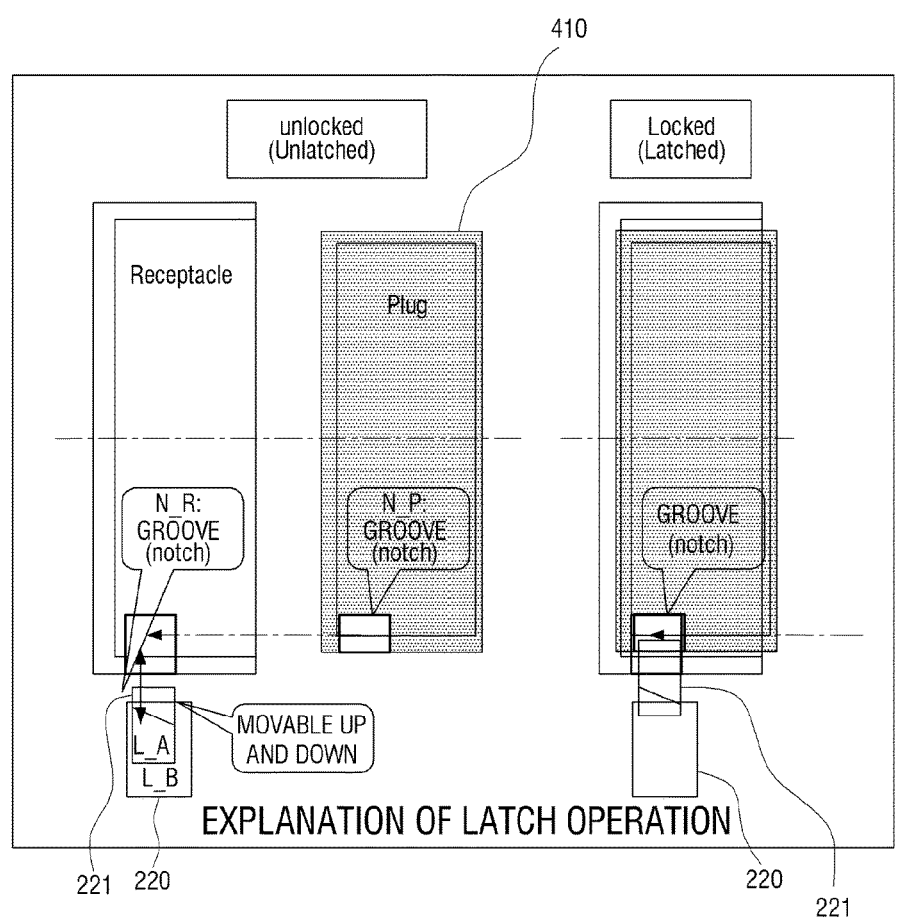
FIG. 8 is a view illustrating an operation of a locking unit according to an exemplary embodiment of the present general inventive concept.

FIG. 8 is a view illustrating an operation of a locking unit 220 according to an exemplary embodiment of the present general inventive concept.

Referring to FIGS. 4 and 8, a moving member 221 of the locking unit 220 may move from side to side (i.e., up and down as illustrated in FIG. 8). Thus, when the cable connector 400 of FIG. 1 is released, the moving member 221 of the locking unit 220 is arranged in a lower region, that is, on the locking unit 220, such that the cable connector 400 may be installed in the housing unit 210.

Thereafter, when the connector 410 of the cable connector 400 is installed in the housing unit 210, the moving member 221 of the locking unit 220 may be moved to the predetermined groove 430 of the connector 410 of the cable connector 400. When the moving member 221 is positioned at the predetermined groove 430 of the connector 410, the cable connector 400 is not released by the moving member 221 even when a user desires to release the cable connector 400.

Meanwhile, although illustrate and described in FIG. 8 that one locking unit 220 is provided, two locking units 220 may be arranged at both sides of the housing unit 210.

Figure 9:
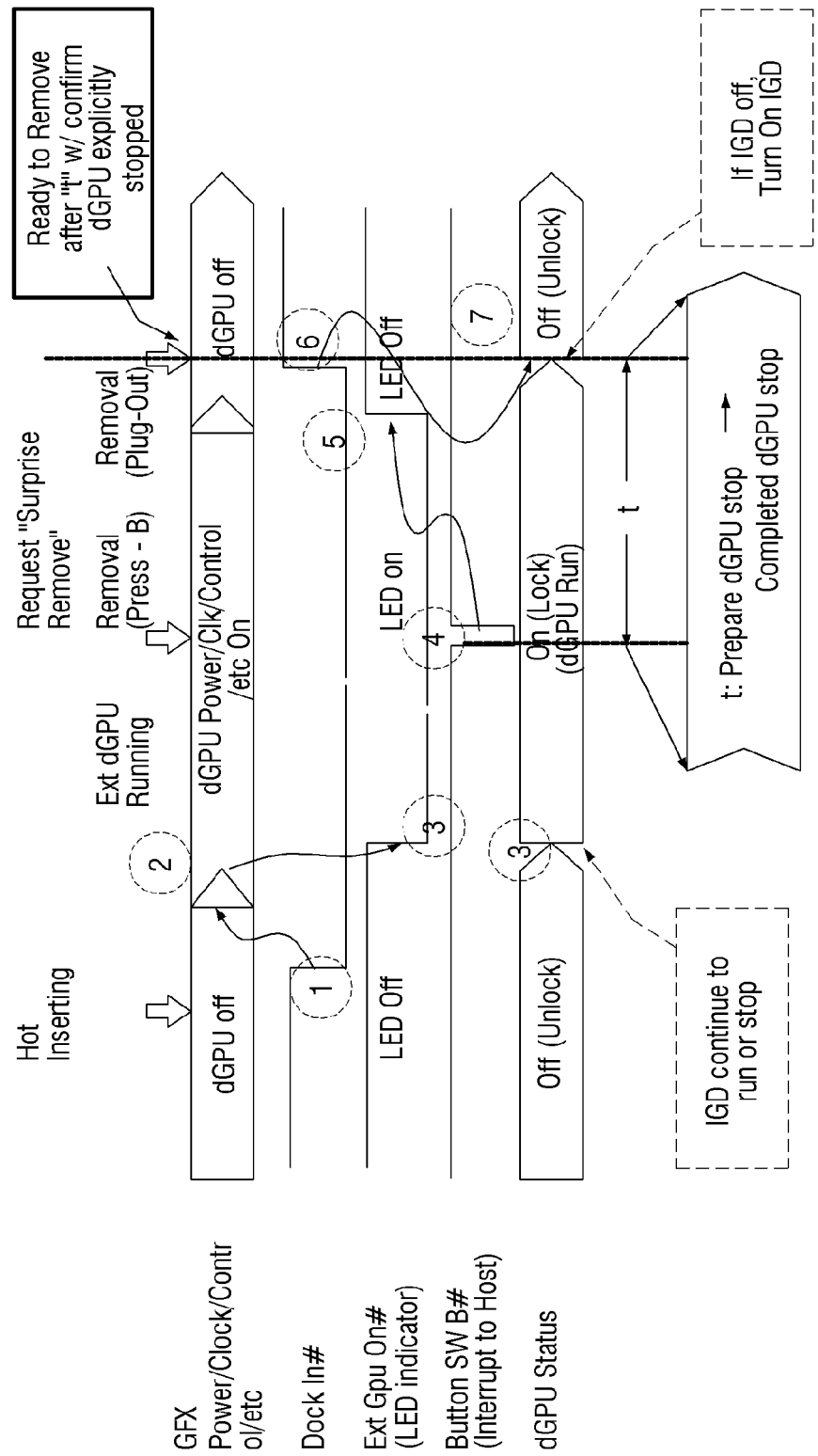
FIG. 9 is a view illustrating an example of converting an operation mode of the electronic apparatus according to a connection state with the external apparatus according to an exemplary embodiment of the present general inventive concept.

FIG. 9 is a view illustrating an operation of the locking unit 220 according to an exemplary embodiment of the present general inventive concept.

Referring to FIGS. 4 and 9, first of all, the external apparatus 300 and the electronic apparatus 100 are separated. Under this condition, (1) when the external apparatus 300 and the electronic apparatus 100 are connected through the cable connector 400 (i.e., the connection between the external apparatus 300 and the electronic apparatus 100 is sensed or determined), (2) the operation mode of the electronic apparatus 100 is converted from a first operation mode to a second operation mode. Thereafter, (3) the locking unit 220 moves the moving member 221, so as to lock the external apparatus 300 and the electronic apparatus 100. By the control of the locking unit 220, the display unit 230 displays an LED indicating that releasing is not possible.

Thereafter, (4) upon receiving a connection release command from a user, specifically, when receiving a command to release the apparatuses through a user interface window, or when a user pushes a cable connector button 440, the operation mode the electronic apparatus 100 is converted from a second operation mode to a first operation mode. (5) When the operation mode of the electronic apparatus 100 is converted to a first operation mode by the operation of conversion, the locking unit 220 moves the moving member 221, so as to release the electronic apparatus 100 from the external apparatus 300. And the display unit 230 may block the display operation of LED so as to indicate that releasing is possible. Meanwhile, although illustrated that detachability is displayed by turning off the LED, detachability may be displayed by turning on the LED, and the LED may be turned off to display that releasing is not possible.

When the connection of the external apparatus 300 and the electronic apparatus 100 is released by moving the moving member 221, (6) the user may release the cable connector 400 from the electronic apparatus 100, and (7) the external apparatus 300 also enters an OFF state in response to the release of the cable connector 400.

Meanwhile, although the present exemplary embodiment illustrates that the external apparatus 300 enters an OFF state in response to the release of the cable connector 400, the button 440 that receives input of a connection release command may be connected to an HPD pin, and in this case, the external apparatus 300 may be turned off before the release of the cable connector 400 by using a signal of the HPD pin.

Figure 10:
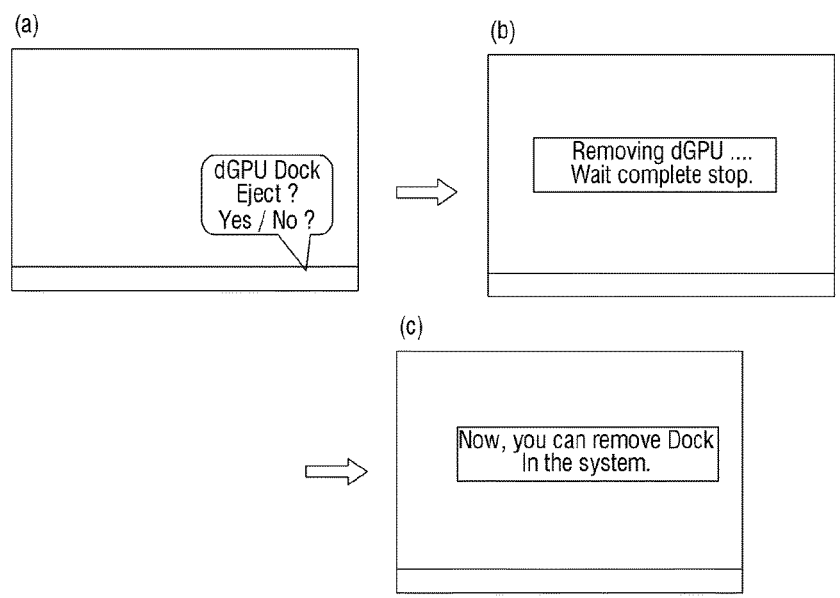
FIG. 10 is a view illustrating various examples of a user interface window that may be displayed in a user interface unit in FIG. 2 according to an exemplary embodiment of the present general inventive concept.

FIG. 10 is a view illustrating various examples of a user interface window that may be displayed in the user interface unit 130 of FIG. 2.

Referring to view (a) of FIG. 10, when the user interface window receives input of a connection release command through a physical button 440, it receives confirmation from the user whether to proceed with the connection release. Upon receiving the user confirmation through the user interface window, the operation mode of the electronic apparatus 100 is converted from a second operation mode to a first operation mode as described above.

Referring to view (b) of FIG. 10, after receiving the user confirmation through the user interface window, the user interface window displays that the operation mode of the electronic apparatus 100 is being converted.

Referring to view (c) of FIG. 10, as the electronic apparatus 100 is converted, and the operation of the locking unit is stopped, the user interface window displays that releasing is possible.

Meanwhile, although the present exemplary embodiment illustrates that when a connection release command is input though a physical button provided for the cable, the connection release command is confirmed through the user interface window, such an operation may be omitted. Further, the connection release command may not be input through a physical button, but through the user interface window.

FIG. 11 is a view illustrating an operation of an electronic apparatus 100' and an external apparatus 300' according to another exemplary embodiment of the present invention.

Referring to FIG. 11, the electronic apparatus 100' according to another exemplary embodiment of the present general inventive concept includes at a bottom thereof a socket unit 200 to be connected with the external apparatus 300'. Further, the socket unit 200 may be directly connected with a socket unit 200 of the external apparatus 300', rather than through a cable connector.

The electronic apparatus 100' according to another exemplary embodiment of the present general inventive concept have the same operation as that of the electronic apparatus 100 and the socket unit 200 described above, with the only difference in terms of their position, and thus, description on the overlapped details will be omitted.

Meanwhile, although illustrated in the illustrated example that the locking unit 220 is arranged on the external apparatus 300', the locking unit 220 may be arranged on the electronic apparatus 100'. Further, in the illustrated example, a release button 340 to release the external apparatus from the electronic apparatus 100 is arranged on the external apparatus 300', it may be embodied that the release button 340 may be arranged on the electronic apparatus 100'.

FIG. 12 is a view illustrating an operation of an electronic apparatus 100" and an external apparatus 300' according to another exemplary embodiment of the present invention.

Referring to FIG. 12, the electronic apparatus 100" according to another exemplary embodiment of the present general inventive concept includes at a bottom end thereof a socket unit 200 to be connected with an external apparatus 300". Further, the socket unit 200 may be directly connected with a socket unit 200 of the external apparatus 300', rather than through a cable connector. The electronic apparatus 100" according to another exemplary embodiment of the present general inventive concept may be a tablet device or a slate PC, for which a separate keyboard input unit is not provided, but is not limited thereto.

The external apparatus 300' according to another exemplary embodiment of the present general inventive concept may be an apparatus which includes a keyboard, a touch pad, etc., but is not limited thereto.

The electronic apparatus 100" according to another exemplary embodiment of the present general inventive concept have the same operation as that of the electronic apparatus 100 and the socket unit 200, with the only difference being in terms of their position, and thus, description on the overlapped details will be omitted.

Figure 13:
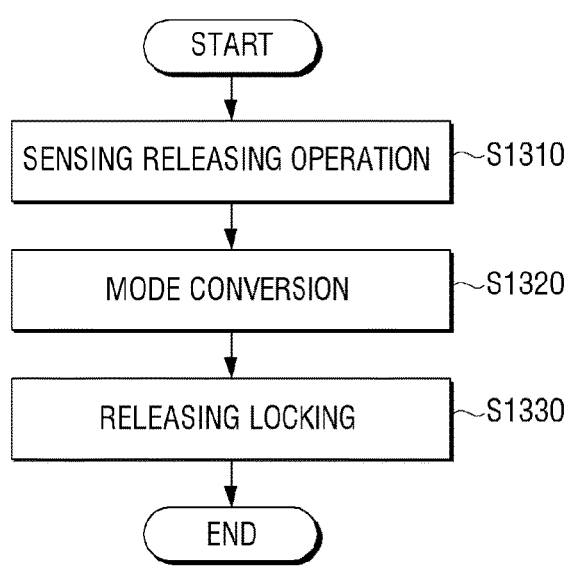
FIG. 13 is a flow chart illustrating a method for controlling an electronic apparatus according to an exemplary embodiment of the present general inventive concept.

FIG. 13 is a flow chart illustrating a method of controlling an electronic apparatus 100 according to an exemplary embodiment of the present general inventive concept.

First, an external apparatus 300 is connected with an electronic apparatus 100, and the external apparatus 300 and the electronic apparatus 100 are physically connected by a moving member that is movable. Herein, the external apparatus 300 may be a docking apparatus as described above, but is not limited thereto.

Under this condition, input of a release command from the external apparatus 300 is received (S1310). Specifically, the input of a release command may be received through a user interface window, or through a separate physical button. When the external apparatus 300 and the electronic apparatus 100 are connected through a cable connector 400, the physical button may be provided on the button to release a connector 410 of the cable connector 400 from the electronic apparatus 100. Or when the external apparatus 300 is directly connected with the electronic apparatus 100, the physical button may be provided on the button to release the external apparatus 300 from the electronic apparatus 100.

Thereafter, the operation mode of the electronic apparatus 100 is converted from a second operation mode to a first operation mode (S1320). Specifically, upon receiving input of a release command, the operation mode of the electronic apparatus 100 may be converted to a first operation mode of using only the function in the electronic apparatus 100. For example, the function herein may be a graphic processing function.

Subsequently, when the electronic apparatus 100 is converted to a first operation mode, a physical connection between the external apparatus 300 and the electronic apparatus 100 may be released by using the moving member (S1330).

The control method according to the exemplary embodiment of the present general inventive concept described above prevents a physical short circuit between the electronic apparatus 100 and the external apparatus 300 by using a locking unit 220 in a second operation mode in which the graphic processing unit 310 of the external apparatus 300 is used. The control method in FIG. 13 may be implemented on the electronic apparatus 100 having a configuration of FIG. 2, and may also be implemented on an electronic apparatus 100 having other configurations. Further, the control method in FIG. 13 may be implemented on an external apparatus 300 having a configuration of FIG. 3.

The present general inventive concept can also be embodied as computer-readable codes on a non-transitory computer-readable medium. The non-transitory computer-readable medium can include a computer-readable recording medium and a computer-readable transmission medium. The non-transitory computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus connectable with an external apparatus, the electronic apparatus comprising:
   a locking mechanism configured to be operated to one of lock or unlock a physical connection with the external apparatus; and
   a processor configured to control one of a plurality of operation modes of the electronic apparatus, while the electronic apparatus and the external apparatus are connected,
   wherein the processor is further configured to control the locking mechanism to maintain the lock of the physical connection with the external apparatus if the electronic apparatus is in an operation mode in which the electronic apparatus uses a graphic processing unit of the external apparatus to perform graphic processing.

2. The electronic apparatus as claimed in claim 1, further comprising:
   a graphic processor configured to perform graphic processing.

3. The electronic apparatus as claimed in claim 1,
   wherein, if the electronic apparatus and the external apparatus are not connected, the processor is further configured to control the electronic apparatus to operate in a first operation mode in which the electronic apparatus uses only a graphic processor of the electronic apparatus to perform graphic processing, and
   wherein, if the electronic apparatus and the external apparatus are connected, the processor is further configured to control the electronic apparatus to operate in a second operation mode in which the electronic apparatus uses at least one of the graphic processing unit of the external apparatus and the graphic processor to perform graphic processing.

4. The electronic apparatus as claimed in claim 1, further comprising:
   a communication interface configured to receive a release command from the external apparatus.

5. The electronic apparatus as claimed in claim 4, wherein the processor is further configured to control the locking mechanism to release the physical connection with the external apparatus if the release command is received by the communication interface.

6. The electronic apparatus as claimed in claim 4,
   wherein, if the release command is received, the processor is further configured to use only a graphic processor of the electronic apparatus to perform graphic processing, and
   wherein, after the processor controls to use only the graphic processor of the electronic apparatus, the processor is further configured to control the locking mechanism to release the physical connection with the external apparatus.

7. The electronic apparatus as claimed in claim 4, wherein, if the release command is received by the communication interface while the electronic apparatus is in the operation mode in which the electronic apparatus uses the graphic processing unit of the external apparatus to perform graphic processing, the processor is further configured to control the locking mechanism to maintain the lock of the physical connection with the external apparatus despite the release command being received by the communication interface.

8. The electronic apparatus as claimed in claim 4, wherein, if the release command is received by the communication interface while the electronic apparatus is in the operation mode in which the electronic apparatus uses the graphic processing unit of the external apparatus to perform graphic processing, the processor is further configured to control an indicator to indicate that the physical connection between the electronic apparatus and the external apparatus in unable to be released.

9. The electronic apparatus as claimed in claim 1, further comprising:
a user interface configured to receive an input to release the physical connection with the external apparatus.

10. The electronic apparatus as claimed in claim 1, further comprising:
a socket configured to interface between the electronic apparatus and the external apparatus,
wherein the electronic apparatus and the external apparatus are connected through the socket and the release command is received from the external apparatus through the socket.

11. The electronic apparatus as claimed in claim 1, wherein the electronic apparatus is configured to indicate that the electronic apparatus is detachable from the external apparatus, while the external apparatus is connected with the electronic apparatus.

12. The electronic apparatus as claimed in claim 1, further comprising a user interface configured to display a notification that the electronic apparatus is detachable.

13. The electronic apparatus as claimed in claim 1, further comprising:
a socket configured to interface between the electronic apparatus and the external apparatus,
wherein the socket is directly connected with the external apparatus.

14. The electronic apparatus as claimed in claim 13, wherein the socket is interfaced with the external apparatus via at least one of high definition multimedia interface (HDMI) and thunderbolt.

15. The electronic apparatus as claimed in claim 1, wherein the graphic processing unit of the external apparatus is a discrete graphic processing unit (dGPU) provided on a main board.

16. A method of controlling an electronic apparatus connectable with an external apparatus, the electronic apparatus including a locking mechanism configured to be operated to one of lock or unlock a physical connection with the external apparatus, and a processor configured to control one of a plurality of operation modes of the electronic apparatus, while the electronic apparatus and the external apparatus are connected, the method comprising:
locking, by the locking mechanism, the physical connection with the external apparatus; and
controlling, by the processor, the locking mechanism to maintain the lock of the physical connection with the external apparatus if the electronic apparatus is in an operation mode in which the electronic apparatus uses a graphic processing unit of the external apparatus to perform graphic processing.

17. An electronic system, comprising:
an external apparatus comprising a graphic processing unit;
an electronic apparatus comprising a graphic processor; and
a locking mechanism incorporated in one of the electronic apparatus and the external apparatus, the locking mechanism configured to be operated to one of lock or unlock a physical connection between the external apparatus and the electronic apparatus,
wherein the electronic apparatus is configured to control the locking mechanism to maintain the lock of the physical connection with the external apparatus if the electronic apparatus is in an operation mode in which the electronic apparatus uses the graphic processing unit of the external apparatus to perform graphic processing.

18. The electronic system as claimed in claim 17, wherein the external apparatus further comprises:
a keyboard configured to receive an input to release the physical connection; and
a socket configured to interface between the external apparatus and the electronic apparatus.

19. The electronic system as claimed in claim 18,
wherein the electronic apparatus is further configured to change a current operation mode of the electronic apparatus to an operation mode in which the electronic apparatus uses only the graphic processor to perform graphic processing if the input to release the physical connection is received from the external apparatus, and
wherein the electronic apparatus is further configured to control the locking mechanism to release the physical connection from the external apparatus if the current operation mode of the electronic apparatus is changed to the operation mode in which the electronic apparatus uses only the graphic processor to perform graphic processing.

20. The electronic system as claimed in claim 17, wherein the electronic apparatus is further configured to indicate that the electronic apparatus is detachable from the external apparatus if the locking mechanism releases the physical connection from the external apparatus.

* * * * *